(12) United States Patent
Schumacher et al.

(10) Patent No.: US 11,229,505 B2
(45) Date of Patent: Jan. 25, 2022

(54) DEVICE FOR CORRECTING MISALIGNED TEETH AND METHOD FOR PRODUCTION THEREOF

(71) Applicants: Pascal Roman Schumacher, Cologne (DE); Yong-Min Jo, Duesseldorf (DE)

(72) Inventors: Pascal Roman Schumacher, Cologne (DE); Yong-Min Jo, Duesseldorf (DE)

( * ) Notice: Subject to any disclaimer, the term of this patent is extended or adjusted under 35 U.S.C. 154(b) by 304 days.

(21) Appl. No.: 16/184,219

(22) Filed: Nov. 8, 2018

(65) Prior Publication Data
US 2019/0090988 A1 Mar. 28, 2019

Related U.S. Application Data

(63) Continuation of application No. PCT/EP2017/060940, filed on May 8, 2017.

(30) Foreign Application Priority Data

May 10, 2016 (DE) .......................... 102016108630.4

(51) Int. Cl.
  *A61C 7/28* (2006.01)
  *A61C 7/20* (2006.01)
  *A61C 7/14* (2006.01)
(52) U.S. Cl.
  CPC ................ *A61C 7/28* (2013.01); *A61C 7/148* (2013.01); *A61C 7/20* (2013.01); *A61C 2201/007* (2013.01)
(58) Field of Classification Search
  CPC .. A61C 7/28; A61C 7/148; A61C 7/20; A61C 2201/007
  See application file for complete search history.

(56) References Cited

U.S. PATENT DOCUMENTS 3,762,050 A * 10/1973 Dal Pont .................. A61C 7/28
                                                                433/21
4,479,779 A    10/1984 Wool
(Continued)

FOREIGN PATENT DOCUMENTS

CN      203226911 U    10/2013
DE   102013204359 A1    9/2014
(Continued)

OTHER PUBLICATIONS

Machine English translation of DE102015009345A; obtained from www.worldwide.espacenet.com on Mar. 7, 2021, 33 pages.*

*Primary Examiner* — Nicholas D Lucchesi
*Assistant Examiner* — Hao D Mai
(74) *Attorney, Agent, or Firm* — Von Rohrscheidt Patents

(57) ABSTRACT

A device for correcting misaligned teeth, the device including an arc element; and at least two transmission elements, wherein each of the at least two transmission elements is configured to cooperate with a respective tooth surface and includes a respective coupling portion wherein each of the at least two transmission elements is connected or connectable in the respective coupling portion with the respective arc element in a force transmitting manner, wherein the arc element has an overall parabolic cambered shape that is adapted to a lower jaw or an upper jaw of a patient, wherein the arc element includes at least one activation section which is arranged between two adjacent transmission elements of the at least two transmission elements and configured so that the arc element is at least locally elastically deformed in an installed condition of the device.

8 Claims, 9 Drawing Sheets

(56) References Cited

U.S. PATENT DOCUMENTS

| | | | |
|---|---|---|---|
| 4,900,251 A * | 2/1990 | Andreasen | A61C 7/20 433/20 |
| 5,624,258 A | 4/1997 | Wool | |
| 6,086,364 A * | 7/2000 | Brunson | A61C 7/282 433/10 |
| 6,183,250 B1 * | 2/2001 | Kanno | A61C 7/28 433/17 |
| 6,190,166 B1 * | 2/2001 | Sasakura | A61C 7/12 433/11 |
| 2007/0154859 A1 * | 7/2007 | Hilliard | A61C 7/20 433/20 |
| 2008/0254403 A1 | 10/2008 | Hilliard | |
| 2014/0120491 A1 * | 5/2014 | Khoshnevis | A61C 7/125 433/11 |
| 2017/0151037 A1 * | 6/2017 | Lee | A61C 7/28 |
| 2017/0296304 A1 * | 10/2017 | Tong | A61C 7/12 |
| 2018/0221113 A1 * | 8/2018 | Tong | A61C 7/20 |
| 2019/0046298 A1 * | 2/2019 | Cinader, Jr. | A61C 7/285 |

FOREIGN PATENT DOCUMENTS

| | | | | |
|---|---|---|---|---|
| DE | 102015009345 A1 * | 1/2016 | | A61C 7/12 |
| WO | WO2017007079 | 1/2011 | | |
| WO | WO2015178655 | 11/2015 | | |

\* cited by examiner

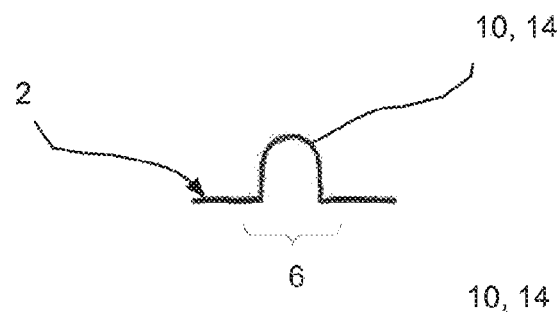
FIG. 8A
FIG. 8B
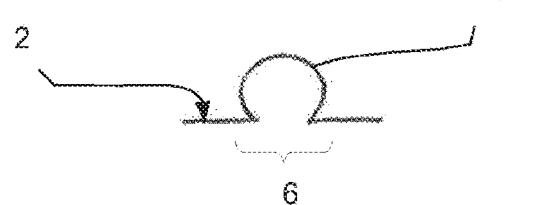
FIG. 8C
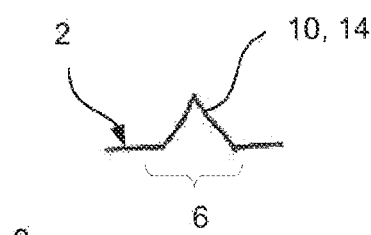
FIG. 8D
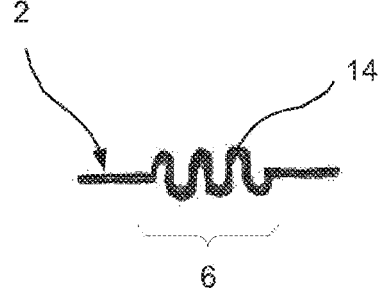
FIG. 8E
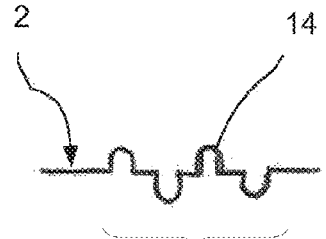
FIG. 8F
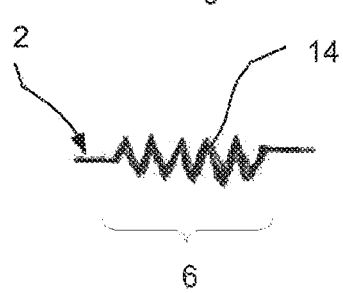

DEVICE FOR CORRECTING MISALIGNED TEETH AND METHOD FOR PRODUCTION THEREOF

RELATED APPLICATIONS

This application is a continuation of International Patent application PCT/EP2017/060940 filed on May 8, 2017 claiming priority from German patent application DE 10 2016 108 630.4 filed on May 10, 2016, both of which are incorporated in their entirety by this reference.

FIELD OF THE INVENTION

The invention relates to a device for correcting misaligned teeth and a method for production thereof.

Devices for correcting tooth misalignments are typically so called braces which are used in particular for young patients to treat tooth misalignments. The devices at hand are typically fixed devices which are permanently installed in a mouth of a patient during a treatment period of the respective patient and which are not removed from the mouth overnight. Using these devices it is possible to move teeth in a lower jaw or upper jaw, this means turning them about their vertical axes and/or transversal axes and/or to move them in a translatoric manner.

An arc element according to the instant application is an element of a brace which connects individual teeth or transmission elements arranged on the individual teeth with each other. Since the teeth of the lower jaw as well as of the upper jaw are arranged in a typically parabolic shape along the jaw the arc element of the instant device also has a corresponding overall shape. Known arc elements are typically made from metal, in particular steel, these are typically manually or automatically bent wire segments which are individually adapted to a respective treatment situation.

Transmission elements according to the instant application are elements which are used for transmitting forces between the arc element and a respectively contacting tooth or the respectively contacting teeth. The transmission elements are typically designated as brackets in the art. The transmission elements cooperate in a force transferring manner, in particular using friction locking with the respective arc element. A corresponding special shape of the transmission elements enables an orthodontist to move a respective tooth in an intended manner wherein the transmission element cooperates with the respective tooth.

Furthermore, an activation section according to the instant application is a section of the arc element that is activated, this means enabled to influence at least one adjacent transmission element and thus influence a respective tooth to be treated through an effect of a reset force and/or reset torque. An activation section of this type is typically configured as a so called loop. The loop is typically a "detour" that is introduced into the arc element, wherein the loop provides a length reservoir for the arc element, so that the arc element can be expanded or compressed in this portion. Therefore, the loop performs a spring function. A force information that is stored in the activation section can be transmitted to the teeth through the coupling between the arc element and the transmission elements. Thus, it is appreciated that a deformation of the arc element has to have at least an elastic portion in the at least one activation section so that a reset force is generated in the arc element.

A form locking element according to the instant application is any type of element that is configured to provide form locking between the arc element and an associated transmission element. Thus, it is essential according to the invention that the obtained form locking blocks a longitudinally parallel movement of the arc relative to the respective transmission element by the form locking. Put differently elements which establish a form locking between the arc element and the transmission element but which only block movement in a direction perpendicular to a longitudinal axis of the arc element are form locking elements according to the invention in principle but do not achieve the object of the invention by themselves. Thus, a classic ligature does not achieve the object of the invention since it does not provide form locking in a longitudinal parallel direction of the arc element.

A form locking element can be for example a protruding lug, an undercut key, for example configured to engage an undercut groove and similar. The embodiments recited infra are exemplary but not exclusive.

Blocking a relative movement according to the invention means that unintentional slippage between the arc element and the transmission element is prevented by the form locking element. Thus, the technical success is relevant for the invention in that forces imparted by the arc element are transmitted without loss to the transmission elements. Thus, it is not detrimental when the corresponding form locking element initially has to travel along a contact distance, e.g. 0.1 mm due to fabrication tolerances before providing a force transmitting stop between the arc element and the respective transmission element before the form locking element engages the transmission element so that it can transfer forces. Elastic deformations of the involved materials are negligible.

With reference to the described method a "capturing" of a position of teeth is typically interpreted as a scanning process. A scanning process of this type can be performed e.g. inter oral, wherein a corresponding inter oral scanner is used. A device of this type is configured to detect image information regarding teeth of a patient to be treated, wherein the image information is then typically provided in a digital form. Eventually the detection provides digital information regarding a position of the teeth in the moment of detection.

In this context a digital model according to the instant invention is a model that is only provided virtually, in particular as a CAD software. A digital model of this type represents a virtual image of the previously captured teeth of the patient to be treated. Typically, the detection of the teeth is done in detail so that the digital model of the detected teeth or their respective position corresponds to real properties of the patient to be treated with a high level of precision.

The digital model facilitates virtually designing an arc element. Therefore, the arc element is not physically produced in this step, e.g. by a bending process from a wire segment and adapted by trial and error but only generated virtually, in particular by a CAD software. Since the device according to the instant invention is a so called active orthodontic device which imparts forces in a controlled manner upon the teeth to be treated it is appreciated that the arc is not precisely adapted to actual properties of the dentition to be treated but is already formed in view of a respectively intended end position of the teeth. In particular it is conceivable to design a plurality of arcs wherein each individual arc can achieve a partial result on a path from an initial tooth position to a desired end position of the tooth. A treatment of this type is therefore performed in a plurality of individual steps.

The digital model which corresponds at least essentially to the actual condition in the moment when the teeth are treated is virtually transposed into a so called set up model which represents an individual desired configuration of the teeth to be treated after a successful completion of the orthodontic treatment. The arc, advantageously a plurality of arcs is generated based on the set up model or based on individual intermediary steps between the digital (initial) model and the set up model (final model).

Fabricating the arc based on the "digital model" is to be interpreted according to the instant application so that the digital model of the respective teeth which reflects the initial situation of the teeth to be treated is used as a starting point for designing the arc, however the arc does not have to be directly adapted to the digital model and will typically not be directly adapted to the digital model.

BACKGROUND OF THE INVENTION

Devices and methods of the generic type recited supra are already known in the art. This technique that uses an arc element with at least one activation section described supra is also designated as standard edge wise technique.

For example, the European patent application EP 2 204 136A2 discloses a device of the generic type and a method of the generic type for producing the device. The document discloses a method where a position of teeth of a patient is detected by an inter oral scanner. The data thus captured is processed by a data processing system wherein a position of the teeth is virtually adjusted. Changing the position of the individual teeth is performed in a manner so that a nominal position of the teeth is eventually provided which symbolizes the position of the teeth after completion of treatment of the respective patient.

The disclosed technique facilitates to virtually design an arc element of an associated brace and then automatically produce the arc element by a bending machine. This has the distinct advantage that manual bending according to the prior art that is often performed directly by the treating orthodontist can be omitted. This is advantageous in particular with respect to precision of fabricating the respective arc element and with respect to cost of producing the arc element. The advantage in the precision of producing the respective arc is in particular that treating a respective tooth misalignment can be performed more precisely, this means in particular forces impacting the teeth that are imparted by the arc element can be predicted more precisely.

In order to activate the arc element at least one activation section is introduced into the arc element wherein the activation section is for example configured as a loop according to the document recited supra. As described supra it is possible by the loops to impart a deformation information upon the arc element through its installation, wherein the arc element deforms elastically in the portion of its activation section so that a reset force is stored in the activation element. This reset force then impacts the teeth after coupling the arc element with the transmission elements and therefore leads to a movement of the teeth.

For a transmission of the force information stored in the arc element it is necessary that a force transmitting connection is established between the arc element and the transmission element. A connection of this type is typically established in the prior art using a so called ligature. This is a separate connection device that is installed into the associated transmission elements during an insertion of the arc element. A ligature can be produced for example from a thin wire or a piece of rubber which is wound about corresponding anchoring elements at the transmission elements wherein the arc element that is respectively applied to the transmission element is pressed against the transmission element so that a force transmitting friction locking is obtained.

The ligature furthermore prevents that the arc element is disengaged from a respective transmission element. A typical transmission element can include for example a so called bracket slot into which the arc element is inserted. In order to prevent the arc element from sliding out of the bracket slot the ligature is applied after inserting the arc element.

In order to be able to cause a force transmission between the arc element and the associated transmission element which can cause a movement of the respectively associated tooth along the jaw bone, this means in a forward or backward direction it is required to establish a force transmission between the arc element and the transmission element or the transmission elements in a direction that is parallel to a longitudinal axis of the arc element. The term parallel to the longitudinal axis relates to a particular location of the arc element. It is appreciated that a longitudinal axis of a parabolic arc element is parabolic as well, wherein the longitudinal axis also has a corresponding curvature as a function of a local curvature of the arc element. Thus, the term "longitudinal axis" in association with the arc element does not relate to an axis in the mathematical sense which would be a straight line in any case.

Using the known connection technique between an arc element and associated transmission elements using the ligature described supra facilitates a force transmission in the longitudinal axis parallel direction of the arc element through the described friction locking. Put differently the arc element is pressed by the ligature against the transmission element e.g. into the bracket slot of a bracket so that a friction force can act between the arc element and the transmission element. This facilitates transmitting a longitudinal axis parallel force between the arc element and the transmission element.

This known force transmitting connection has the disadvantage that a certain slippage occurs as a matter of principle between the elements. Put differently the force that is stored in the arc element cannot be introduced completely into the transmission elements so that at least a portion of the force decreases at least a portion of the elastic deformation of the arc element due to a slippage between the arc element and respective transmission elements so that a portion of the force is lost. This has the effect that a precise determination of forces applied to a tooth by a brace is hardly possible at all. Accordingly, it is difficult to plan an orthodontic treatment in its entirety before the treatment is started since the treatment plan has to be adjusted and adapted as a function of a progress of the treatment. It is also hardly possible to predict which forces are actually stored in the orthodontic device or have to be introduced into the orthodontic device in order to impart a particular force upon the teeth so that a desired movement of the teeth is achieved. Namely a prediction of an anticipated force loss between the arc and the teeth is not possible.

Lack of precision can have the effect that teeth are moved accidentally too much or too little so that the treatment method has to approach the intended final result in many interactive steps that would otherwise be avoidable.

A solution for this problem can be derived from the German patent application DE 10 2015 009 345 A1. This application describes an arc element that is connected with associated transmission elements by bracket shaped attachment elements. The attachment elements reach about a complementary attachment section of the transmission elements at all sides so that a relative movement between the arc element and the transmission element is blocked in all directions.

The known arc element, however, has the disadvantage of being very complex to produce which is caused by the geometry of the arc element. This has the consequence that the arc elements described in the patent application recited supra are not producible in an economical manner.

BRIEF SUMMARY OF THE INVENTION

Thus, it is an object of the invention to provide a device for correcting tooth misalignments which facilitates treating the teeth in an efficient and gentle manner and wherein the device is simplified compared to known devices.

The object of the invention is achieved by improving upon the device recited supra in that the arc element is configured flat so that a longitudinal axis of the arc element extends in a plane at least in a condition where the arc element is not loaded by any external forces. Put differently the arc element is configured planar so that it is in contact with a flat plate along an entire longitudinal axis of the arc element when applied to the flat plate. An arc element of this type can also be designated as "2D-arc" since the longitudinal axis of the arc element extends in a two dimensional space.

The object is achieved by a device for correcting misaligned teeth, the device including an arc element and at least two transmission elements wherein each of the at least two transmission elements is configured to cooperate with a tooth surface and includes a coupling portion wherein a respective transmission element is connected or connectable in the coupling portion with the arc element in a force transmitting manner wherein the arc element has an overall parabolic cambered shape that is adapted to a lower jaw or an upper jaw, wherein the arc element includes at least one activation section which is arranged between two adjacent transmission elements and configured so that the arc element is at least locally elastically deformed in an installed condition of the device wherein the arc element is connected with the transmission elements in the installed condition of the device so that a reset force is provided in the arc element wherein the reset force is transferrable to the transmission elements by the coupling, wherein the arc element includes at least one form locking element by which the arc element cooperates with a respective transmission element in a form locking manner so that a relative movement of the arc element and the respective transmission element longitudinally parallel to the arc element is blocked in a connection portion of the transmission element wherein the arc element is configured as a loop or meander in at least one activation section so that the arc element is configured to act as a spring in the activation section.

The object is also achieved by a method for producing an arc element for a device for correcting tooth misalignments the method comprising the steps:

a) detecting a position of a plurality of teeth of a lower jaw or an upper jaw of a patient;

b) generating a digital model of the teeth from the detected position of the teeth;

c) virtually designing an arc element for the device based on the digital model;

d) integrally fabricating the virtually designed arc element in one piece so that the virtually designed arc element has at least substantially a shape in which it is useable in the device.

The device according to the invention has many advantages. First of all, it is possible by the at least one form locking element to provide a direct force transmission between the arc element and the respective transmission element. This has the consequence that a force imparted by the arc element is transmitted without loss and in a controlled manner to the intended transmission element and eventually transmitted by the transmission element to the tooth that is to be moved.

Due to the form locking it is possible for the treating orthodontist to precisely determine a force imparted upon the respective tooth. This is based on the idea that a force which is imparted due to an elastic deformation of the arc element in view of a geometry of the arc element and in view of its material properties by the arc element as a reset force upon the connected transmission element is precisely determinable. It is therefore possible for the treating orthodontist using the form locking to precisely adjust the intended force, for example precisely to 0.1 N. A determination of the force transmitted by an arc element is not possible with known devices.

The problem is in particular to arrange a corresponding form locking element exactly at a correct position of the arc element so that an engagement position of the form locking element to engage the transmission element corresponds precisely to an intended displacement of the arc element which corresponds to the intended reset force to be imparted. Put differently producing an arc element of this type is particularly difficult since it has to be known in advance at which location the at least one form locking element has to be placed in order to impart the desired force onto the teeth to be treated when the arc element is installed. This production problem is subsequently discussed in more detail in conjunction with the production method according to the invention. Known bending methods (manually or automatically) do not facilitate achieving this result.

Furthermore, the device according to the invention has the distinct advantage of being producible in a particularly simple manner since it omits complicated three dimensional geometries that are used in the prior art. The method according to the invention is particular in that it forms the at least one activation section within the plane. This means that loops do not move out of the plane of the arc element but are formed within the plane of the arc element.

In particular the arc element of the device according to the invention can be produced from a piece of sheet metal, so that the arc element is immediately provided in its final usable shape. The arc element is eventually two dimensional like the flat piece of sheet metal. A corresponding production method is also an object of the instant application and subsequently described separately.

Typical arc elements which are particularly advantageous for the device according to the invention have a rectangular, in particular square cross section wherein edge lengths of a square cross section are typically in a range of 1.0 mm at the most, advantageously 0.6 mm at the most, further advantageously 0.5 mm at the most. In addition to square cross sections also circular and elliptical cross sections are conceivable.

It is furthermore advantageous when at least one form locking element, advantageously all form locking elements are integrally configured in one piece at the arc element. This way an individual positioning of the form locking elements at the arc element can be omitted which on the one hand side precludes an unintentional incorrect positioning and on the other hand side avoids the problem of producing a non-slip connection between the arc element and the form locking element which would have to be assured in order use the invention successfully.

In an advantageous embodiment of the device the arc element is formed by a shape memory material, in particular by a nickel titanium alloy, advantageously Nitinol. This material can be advantageous also independently from using the form locking element according to the invention. The shape memory materials are so called "super elastic materials" which are characterized by a particularly pronounced elasticity. Due to this elasticity it is hardly possible to plastically deform objects that are made from a shape memory material. In particular selecting a nickel titanium alloy has the advantage of high bio compatibility and a rather low elasticity modulus of approximately 40,000 N/mm$^2$. The latter has the advantage that the reset forces that develop in the arc element due to a deformation are easily controllable and do not already become excessively large for a small deformation. Forces which are required for treating tooth misalignments are typically in a range of approximately 1 N per tooth, sometimes even significantly below.

Super elasticity has the additional advantage that a deformation imparted upon the arc element is ideally a 100% elastic deformation and therefore has no plastic component or only a negligibly small plastic component. The absence of plastic deformation components allows the conclusion that all imparted deformations are elastic deformations and eventually trigger a corresponding reset force in the arc element. As a result, this has the advantage that the forces that are impartable by the arc element are adjustable with a very high level of precision since a precise proportionality between deformation and reset force can be presumed.

The problem when using a shape memory material like e.g. nitinol for an arc element, however, is in forming the activation section. Activation sections of this type are typically configured in the form of loops as described supra. The loops are portions where the arc element is not run straight between adjacent transmission elements but with an increased length. For example, the arc element is run in a form of a loop or of a meander in a portion of the activation section. Activations sections of this type are introducible into a shape memory material only with great difficulty or not at all since they are almost not plastically deformable as described supra. Only special complex heat treatment when forming the loops could help. In order to circumvent this complexity, the subsequently described production method according to the invention is used.

Further configuring the device according to the invention, the arc element includes a plurality of form locking elements that are offset from each other, wherein at least two form locking elements correspond to each other so that they cooperate with the same transmission element in an installed condition of the device. The plurality of the form locking elements facilitates a form locking connection of the arc element with a plurality of transmission elements. Furthermore, it is advantageous to couple plural form locking elements of the arc element with the same transmission element. This is based on the idea that using one or plural form locking elements does not only facilitate transferring linear forces to the respective transmission element, but force pairs, this means torques. Thus, it is only required that the form locking elements are offset from each other so that a lever arm is provided between the form locking elements.

It is appreciated that using plural form locking elements the form locking elements are advantageously arranged behind one another along the longitudinal axis of the arc element.

Advantageously the at least one form locking element, advantageously all form locking elements are formed by a lug that extends radially to the longitudinal axis of the arc element wherein a corresponding transmission element advantageously includes a corresponding coupling portion, in particular a recess which can be advantageously engaged by the lug in a form locking manner. A form locking element of this type is particularly well suited to establish form locking with a respectively contacting transmission element. Thus, it is appreciated that the arc element can also include a recess vice versa which corresponds to a respective form locking element of a transmission element. This embodiment also leads to a form locking and thus to a slip free transmission of forces between the transmission element and the arc element. However, this embodiment is rather detrimental due to the typically low cross section of the arc element since a recess in the arc element would further reduce a cross section of the arc element.

A lug can be in particular a radially protruding cylindrical or rectangular element. Advantageously it is conceivable that the geometry of the form locking element that is configured as the lug exceeds a complexity of a cylindrical shape or of a square shape, e.g. by protruding or recessed portions which can be configured to engage an undercut portion of a transmission element (c.f. advantageous embodiments).

As recited supra a one piece integral configuration of the form locking element and arc element is particularly advantageous. This applies also when the form locking element is formed by a lug according to the preceding description.

Independently from the form locking element being formed by a lug, but in particular in cases where the form locking element is formed by a lug it can be particularly advantageous when the form locking element extends at least partially in a direction perpendicular to the next tooth surface. In a brace which is arranged e.g. lingual, this means on a side of the teeth that is oriented towards the tongue it is advantageous when the respective form locking element of the arc element extends in a vestibular direction, this means in an outward direction.

Furthermore, the device according to the invention is particularly advantageous when the arc element has at least a local curvature, advantageously a plurality of local curvatures which respectively have a curvature radius of 1.0 mm at the most, advantageously 0.5 mm at the most, further advantageously 0.2 mm at the most. An arc element of this type can be adapted to a surface of the teeth particularly well in that the arc element follows a respective surface shape of a respective contacting tooth. This is particular advantageous in that the respective arc element that is provided with the curvatures and thus adapted to the respective teeth only causes very minor discomfort in a mouth of the patient since the patient does not perceive the arc element as a foreign object to the same extent as would be the case with an arc element that is arranged at some distance from the respective contacting tooth surfaces.

Adapting the arc element to tooth surfaces has the additional benefit that forces impacting the arc element, e.g. when a patient is chewing are much less than for arc elements which extend at a distance from the teeth. The explanation is that an arc element that is well adapted to the tooth surfaces has a much smaller contact surface than current arc elements. This has the additional advantage that a risk of non-intentional tearing of the arc element of the device according to the invention is very much reduced over the prior art. Furthermore, attaching the transmission elements at the respective tooth surfaces is simpler since short term peak loads that have to be transmitted between the transmission element and the tooth are reduced due to the smaller contact surface of the associated arc element. This facilitates for example also that attachment surfaces which are required for attachment of a transmission element at a respective tooth can be configured smaller compared to the prior art without increasing a risk of unintentional disengagement of the device from the teeth.

With respect to an advantageous embodiment of the at least one activation section of the arc element it can be particularly advantageous when the activation section is configured as a loop or as a meander. In particular the loop can be configured omega shaped. A meander shape of an activation section can be formed for example from a plurality of partial sections that are arranged in sequence and configured as alternating inverted and non-inverted omega shaped partial sections. By the same token it is conceivable that a meander shaped activation section is configured as a zig zag. Additional advantageous configurations can be derived from the subsequent embodiments.

The configuration of the activation section in the shape recited supra facilitates using the activation section in the form of a spring. Running the arc element in the portion of the respective activation section in a form of a loop or in another geometric shape has the consequence that the arc element has an artificial length extension in this portion. This has the consequence that the arc element can be expanded and/or compressed using the length reservoir provided in the activation section. Thus, the activation section performs the function of a spring whose elongation generates a reset force configured as a tension force and whose compression generates a reset force in the form of a compression force. This has the effect that a desired force component is introducible into the arc element using a corresponding deformation of the respective activation section of the arc element wherein the force component can then impact the respective teeth to be treated due to the force transmitting coupling with one or plural transmission elements.

Improving upon a production method of the type recited supra the object is achieved according to the invention by the method step:

e) fabricating the arc element from a piece of sheet metal material wherein the thickness of the sheet metal is significantly less than all other dimensions of the arc element.

The method is advantageous in particular in that the respective arc element is provided in its final use able shape immediately after the fabrication process without any additional interference of a machine or of a person. Thus, forming the arc element is performed without any influence of bending forces. This has in particular the consequence that the finished arc element according to the method according to the invention is free from internal stress which is introduced into the arc element using the conventional bending method no matter what. The arc element according to the invention, however, is free from internal stress at the moment of insertion into the associated transmission elements. This is advantageous in that freedom from internal stress facilitates a more precise statement which reset forces are activated in the arc element due to an intended displacement.

Furthermore, fabricating the arc element from a piece of sheet metal is advantageous in that this method step can be performed in a particularly simple, cost effective and highly precise manner. A piece of sheet metal according to the instant invention is characterized in that the thickness is significantly smaller than all other dimensions, this means its length and also its width. Sheet metal is suitable for arc elements for orthodontic devices that has a thickness of less than 1.0 mm, in particular of less than 0.6 mm. Using this material, the respective arc element can be fabricated from the sheet metal in a particularly simple manner using laser cutting or wire erosion.

Furthermore, milling and cutting can be used as material removing fabrication methods. It is conceivable for example to mill an arc element from a piece of sheet metal so that the piece of sheet metal has its final shape after completion of the respective milling process. A process of this type can be performed computer controlled and thus in a highly precise manner.

Compared to automated fabrication according to the prior art which bends a bending element using a bending robot a material removing method as proposed by the instant invention is much more exact and precise so that the finished arc element eventually corresponds to the original virtually designed shape with a very high level or precision. A high level of precision when producing the arc element is already not achievable by a bending method since a precise determination of a plastic deformation portion relative to an elastic deformation portion is not possible at a rate of 100% but depends in any case from the individual material properties of the respective specimen.

This type of fabrication also facilitates a precise adaptation of the local shape of the respective arc element to the respectively contacting teeth. Furthermore the production speed is significantly increased over a bending method which helps to reduce cost.

The method is also superior to master forming. e.g. 3 D printing. The 3-D printing is not only rather time consuming but also rather expensive. Furthermore, a precision at least of current 3-D printers is inferior to cutting or milling methods when extremely small curvature radii of an arc element are to be produced along its longitudinal axis.

The fabrication method according to the invention facilitates in particular to form an arc element from a shape memory material, e.g. from a nickel titanium alloy, in particular Nitinol. Using this material is hardly possible when using a bending process for producing the arc element since this material can hardly be bent or cannot be bent at all. This is in particular due to the face that the elastic portion of a shape memory material is particularly pronounced so that applying plastic and thus permanent deformations is hardly ever successful. In particular it would be necessary to heat the piece of material to be processed to a significant processing temperature in order to start a thermal deformation process which is performed independently from elastic properties of the respective material. When using a material removing method, however, no deformation of the respective material piece has to be performed so that the super elastic properties of a shape memory material do not have any detrimental effect.

Thus, using a shape memory material for an arc element is particularly advantageous since it is particularly suitable to precisely determine the reset forces stored in the arc element since there is no plastic deformation due to the deflection of the arc element. Furthermore, using Nickel Titanium alloys is particularly advantageous since they have a high level of biocompatibility.

Using the device according to the invention a treatment method for a patient with a tooth misalignment can be performed in a particular efficient manner. Thus the following treatment method is proposed according to the invention:

A method for correcting tooth misalignments, the method including the steps the steps:

i) detecting a position of a plurality of teeth of an upper jaw and/or a lower jaw of a patient by a scanning device;

ii) transposing data captured by the scanning device into a digital model that virtually replicates the scanned teeth in a starting position in which the scanned teeth were scanned;

iii) starting from the starting position virtually adjusting a position of individual teeth in the digital model so that a nominal position of the teeth is obtained wherein the individual teeth are to be in the nominal position after the treatment method is completed;

iv) breaking a difference of positions of the individual teeth between the starting position and the nominal position down into a plurality of individual movement increments so that the nominal position of the teeth is obtained by sequentially going through the individual movement increments starting from the starting position;

v) determining a suitable bracket for each tooth to be treated;

vi) arranging the brackets at the teeth of the patient according to an association of the brackets;

vii) virtually designing an associated arc element of a device for correcting tooth misalignments for each of the individual movement increments;

viii) producing the virtually designed arc elements respectively by an additive or material removing method integrally in one piece so that the virtually designed arc elements at least essentially have their individual final shapes after their completion;

ix) coupling the individual arc elements over a total duration of the treatment method with brackets arranged on the teeth, wherein a respective current arc element is removed after completion of a real adjustment of a position of the teeth to be treated wherein the real adjustment corresponds to a respective movement increment and then inserting an arc element for the subsequent movement increment.

The treatment method has the distinct advantage that the movement of the teeth can be performed in individual step wherein an individual arc element is fabricated for each individual step. The arc elements are then inserted sequentially as the treatment method progresses. Thus, the treatment method is a sequential method.

The treatment method according to the invention has a particular advantage in that the transmission elements that are connected with the teeth typically do not have to be changed during the duration of the entire treatment process. Instead exclusively the different arc elements cause the teeth to be moved to perform the respective intended movement step by step. The transmission elements should be advantageously individually adapted to the intended movement of the respective tooth before performing the treatment, however, they do not have to be changed during the duration of the treatment.

Furthermore, the method according to the invention is particularly advantageous compared a so called rail therapy, e.g. Invisalign® since the rails that are used in this type of therapy are not equally suited for all types of tooth movements. For example, a rail therapy is not well suited for a translatoric movement of the teeth along a jaw bone. Therefore, rail therapies are often used in combination with typical brackets, wherein the latter initially remedy the greatest misalignments and thereafter the fine alignment is performed by the rails.

Using individualized arc elements facilitates imaging all movement types so that the proposed treatment method can be performed at least essentially independently from the individual starting position of the teeth of the patient to be treated and is always suitable for a treatment as a matter of principle.

In a particularly advantageous embodiment of the treatment method according to the invention the selected brackets are arranged on a bracket carrier before being applied to the respective teeth, wherein the brackets are positioned on the teeth by the bracket carrier in a previously virtually planed position and are connected with the teeth in a force transferring manner after positioning. Put differently the brackets are arranged on a bracket carrier before being placed onto the respective teeth to be treated. Using a bracket carrier, it is possible to precisely position the brackets before installation and to then place the individual brackets at a precise position on the teeth to be treated using the bracket carrier.

Thus, it is conceivable e.g. that the bracket carrier is configured as a reproduced negative shape of the teeth to be treated, thus comparable to a rail which is used for rail therapy. Thus, the individual brackets are arranged on a bracket carrier corresponding to the virtually planned position. The bracket carrier is then placed over the respective teeth to be treated, wherein the bracket carrier seats at a precise position on the teeth to be treated due to its adapted shape. The brackets arranged on the bracket carrier are so to speak in their exact position, namely exactly in the the previously designed virtual position. Then the individual brackets only have to be connected with the teeth in a force transmitting manner, this can be done e.g. by injecting a synthetic material into an intermediary portion between the respective bracket and the respective tooth surface. As a result, the brackets are placed with a very high level of precision at the previously virtually planned positions on the teeth to be treated.

The bracket carrier described supra can be produced in a particularly simple manner by deep drawing it from a synthetic material foil. The shape of the plunger which is used for the deep drawing process can be defined e.g. by an inter oral scan and subsequent forming of a corresponding positive shape in plaster and the shape is thus precisely adapted to the teeth to be treated.

The individual arc elements that are provided for the individual movement increments are advantageously machined from a piece of material in the manner described supra. The resultant advantages have already been described supra in conjunction with the production method according to the invention. Advantageously the arc elements are formed by a shape memory material, in particular nitinol.

The treatment method according to the invention is furthermore advantageous when the individual arc elements which are used sequentially in combination with the individual movement increments respectively have an identical cross section. This is advantageous in that the brackets used only have to be adapted before the treatment to a shape of arc elements that are being used. In particular the bracket slot of the respective brackets only has to be adapted to a shape of arc elements.

BRIEF DESCRIPTION OF THE DRAWINGS

The device according to the invention is now described in more detail with reference to embodiments which are illustrated in the drawing figures, wherein:

FIGS. 8A-8F illustrates various types of activation sections of an arc element of a device according to the invention.

DETAILED DESCRIPTION OF THE INVENTION

Figure 1:
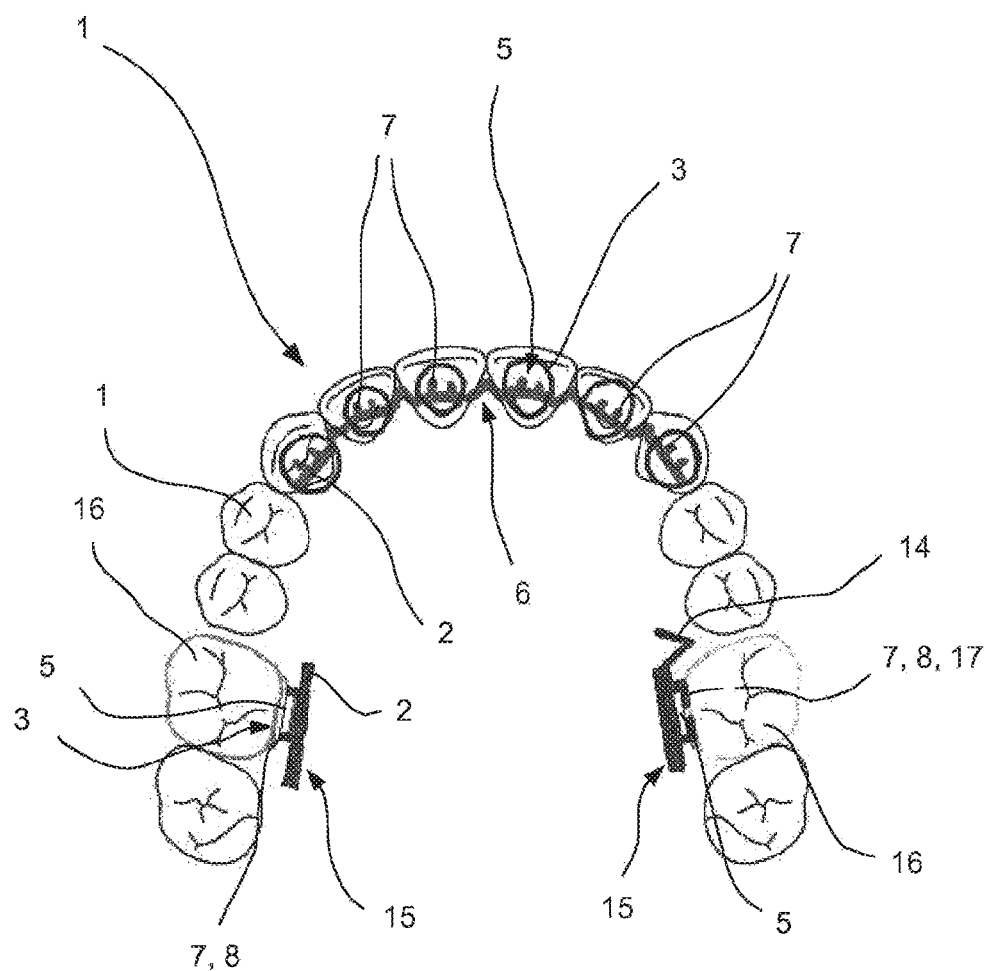
FIG. 1 illustrates an upper jaw with a schematically illustrated device for treating tooth misalignments.

Exemplary devices 1 according to the invention that are illustrated in FIGS. 1, 4, 5-7 and 9 respectively include an arc element 2 and a plurality of transmission elements 3. The transmission elements 3 are used for transmitting forces between the respective contacting teeth 11 and the arc element 2. The transmission elements 3 are typically designated as brackets in the art. The arc element 2 has a square cross section of 0.5 mm×0.5 mm. The arc element 2 is configured flat since it is cut by a laser from a piece of sheet metal. The flat embodiment has the effect that a longitudinal axis 19 of the arc element 2 extends in a plane in a force free condition of the arc element 2 where the arc element is free from imparted forces and similar.

The transmission elements 3 are connected with the respectively contacting teeth in a force transferring manner. This connection is provided in that a relative movement between the transmission elements 3 and the associated teeth 11 is not possible. If at all a relative movement of this type only occurs in the amount of a material expansion of the transmission element 3 or of a composite material between the transmission element 3 and the respective tooth 11.

The arc element 2 and the transmission elements 3 are respectively connected with each other by form locking elements 7. The form locking elements 7 have an effect where they engage a respective coupling portion 5 of a respective transmission element 3 in a form locking manner. This form locking between the arc element 2 and the respective transmission element 3 has an effect so that forces are conductible between the arc element 2 and the transmission element 3 without a relative movement between the arc element 2 and the respective transmission element 3 being caused. Put differently the connection between the arc element 2 and the transmission element 3 is provided without slippage. This way a force which is imparted by the arc element 2 upon the transmission elements 3 is determinable in a particularly precise manner since there is no accidental force reduction due to slippage and sliding between the arc element 2 and the transmission elements 3.

The representation according to FIG. 1 illustrates the device 1 according to the invention only schematically. The arc element 2 of the device 1 is anchored by anchors 15 at rear molars 16. Thus, the rear molars 16 and the front teeth 11 are respectively connected with transmission elements 3. Furthermore, the transmission elements 3 respectively include a coupling portion 5 which engages a form locking element 7 of the arc element 2 in a form locking manner. The form locking elements 16 that are indirectly connected with the rear molars 16 are not connected with the remaining arc element 2 according to the illustration of FIG. 1. This illustration is purely schematic and does not reflect actual conditions, the arc element 2 is run to the molars 16. Furthermore, the transmission element 3 as well as the form locking element 7 at the molars 16 in FIG. 1 are illustrated with excessive height in order to point out their configuration in an exemplary manner.

Thus, it is evident for example that the form locking elements 7 according to FIG. 1 are respectively configured differently at the molars 16. Thus, the form locking element 7 of the left molar 16 in FIG. 1 only includes radially protruding lugs 8 which envelop the coupling portion 5 of the associated transmission element 3 in a form locking manner. The opposite form locking element 7 of the right molar 16 is provided with lugs 8 which include a distal envelopment portion 17. Using this envelopment portion 17 the lugs 8 of the form locking element 7 envelop a corresponding undercut coupling portion 5 of the associated transmission element 3 and thus establish the desired form locking.

At the front teeth of the upper jaw according to FIG. 1 the arc element 2 is respectively attached by protruding lugs 8 at the associated transmission elements 3. Thus, each of the transmission elements 3 cooperates with two form locking elements 7 which is advantageous in that a force transmission between the arc element 2 and the transmission elements 3 is possible. Using merely a form locking element 7 a transmission of this type would only be possible with the form locking element 7 configured so that a rotation of the arc element 2 relative to the associated transmission element 3 is blocked.

Forming form locking elements 7 at the prior art arc element 2 is particularly difficult since precise positioning of the form locking elements 7 is hardly possible. This is caused by the fact that the individual position of the arc element 2 before the connection of the arc element 2 with the transmission element 3 is not determinable according to the prior art and thus is only determined in installed condition. Put differently it was not possible to correctly place the form locking elements 7 in advance in order to then impart the desired force upon the transmission elements 3 or the contacting teeth 11. A precise planning of the geometry of the arc element 2 and of the positions of the transmission elements 3 and a resulting ability to do advance planning of the positions of the form locking elements 7 and the corresponding coupling portions 5 is only facilitated by the production method according to the invention. Thus, it is assured that the deflection of the arc element 2 and the resulting reset forces after connecting the arc element 2 with the transmission elements 3 exactly have the size or sizes which were previously planned as a function of the diagnosed tooth misalignments. Thus, it is now possible using the device 1 according to the invention to precisely plan forces that impact the teeth 11 and to determine with a high level of confidence that these intended forces are also applied in reality.

Activation sections 6 are provided for activating the arc element 2. These activation sections are only schematically illustrated in FIG. 1 but they can be viewed in more detail in FIGS. 4 and 9. Furthermore FIG. 8 provides an exemplary selection of various embodiments of activation sections 6.

The activation sections 6 are provided between the transmission element 3 and the teeth 11 which shall be moved by the device according to the invention in the associated jaw bone in a course of an orthodontic treatment. FIG. 1 illustrates the activation sections 6 schematically with a pointed geometry. This is visible in particular at the form locking element 7 of the right molar 16.

The activation sections 6 facilitate that the arc element 2 is deflectable by significant amounts, this means that the arc element 2 can be locally compressed and locally expanded by an effect of the activation sections 6 so that reset forces are activatable in the arc element 2 due to the elastic properties of the material of the arc element 2 which is advantageously configured from a shape memory material, in particular nitinol, wherein the reset forces then impact the adjacent transmission elements 3. Thus, it is appreciated that the reset forces only impact the adjacent transmission elements 3 due to the fixed connection of the arc element 2 with the transmission elements 3. An overreaching effect of an activation section 6, this means a force impact of an activation section 6 upon a tooth 11 after the adjacent tooth only happens in as far as the respective adjacent tooth moves due to the acting reset forces of the arc element 2 and thus leads to an activation of the respective next activation section 6 (expansion or compression). The activation sections 6 can thus have different configurations as evident in particular from FIG. 8. The geometries thus formed are also designated as "loops".

Figure 2A:
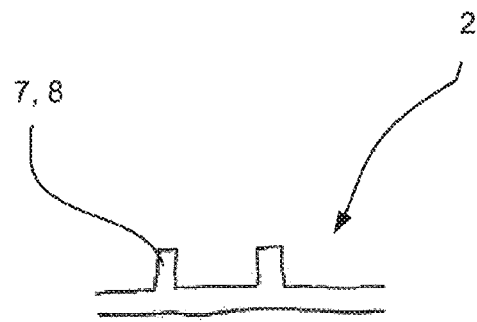
FIGS. 2A-2D illustrate a various types of form locking elements for an arc element of a device according to FIG. 1.
Figure 2B:
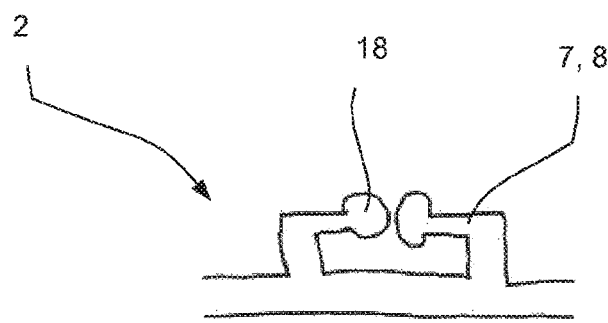
Figure 2C:
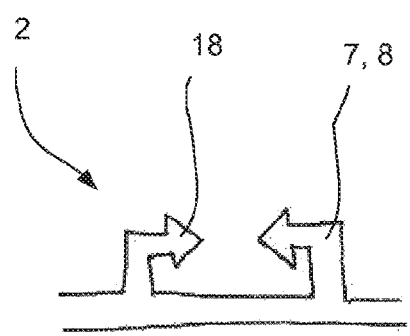
Figure 2D:
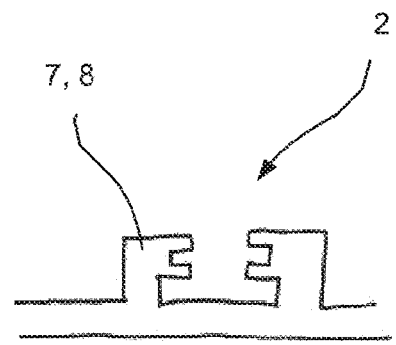

The form locking elements 7 can be configured differently. An exemplary overview can be derived from FIG. 2 in variants a-d. Thus, a differentiation can be made in principle between the form locking elements 7 which envelop a corresponding coupling portion 5 of a transmission element 3 only laterally (FIG. 2A) or which reach behind the coupling portion 5 (FIGS. 2B-2D). Furthermore, the form locking elements 7 can be configured with interlocking hooks 18 which block a movement of the arc element 2 in both directions parallel to a longitudinal axis 19 of the arc element 2 additionally.

Figure 3A:
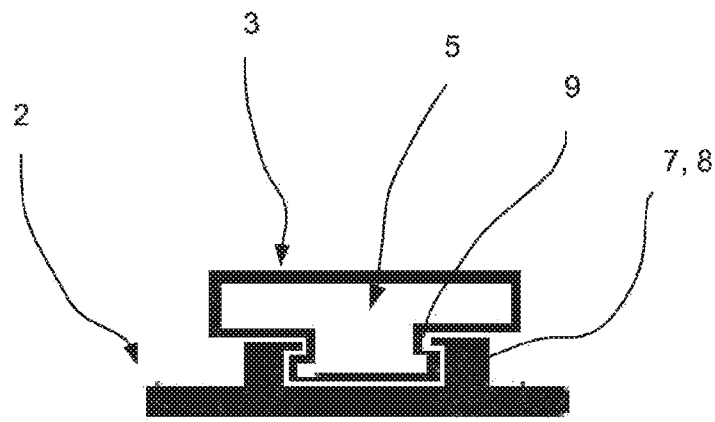
FIGS. 3A-3B illustrate a detail of an engagement of a form locking element with a coupling portion of a transmission element.
Figure 3B:
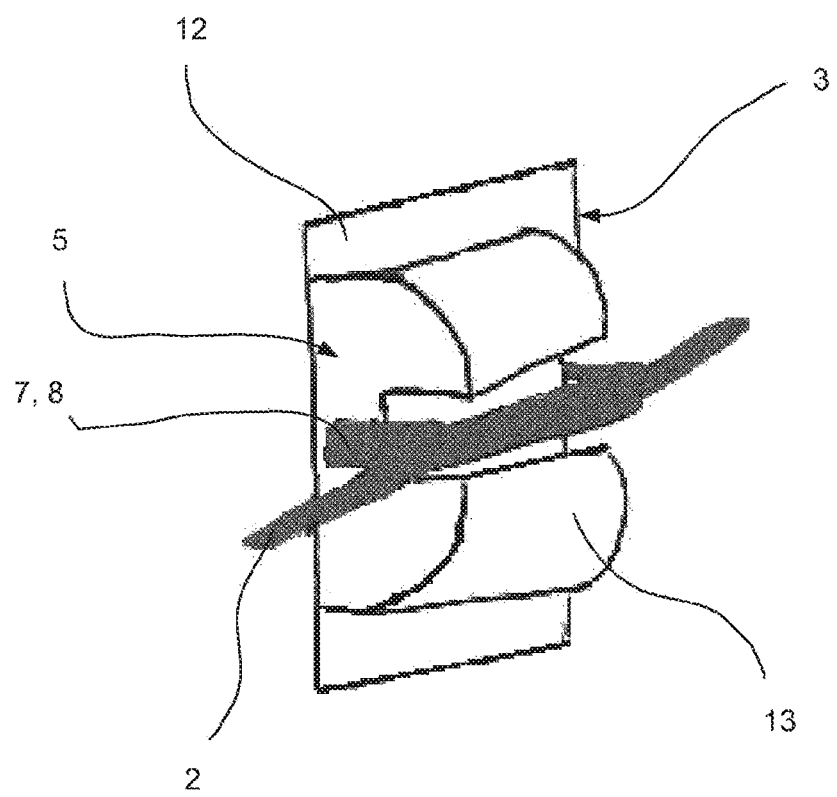

An exemplary representation of an interaction of an arc element 2 with a transmission element 3 is illustrated in FIG. 3. Thus, it is evident in particular how a form locking element 7 that is configured as a lug 8 engages a corresponding coupling portion 5 of a transmission element 3. Thus, the transmission element 3 is configured as a bracket as evident from portion b of FIG. 3 wherein a coupling portion 5 of the bracket is formed by a bracket slot. This bracket slot extends longitudinally over a width of the bracket configured as a groove, wherein the arc element 2 is inserted into the groove of the bracket slot. The form locking elements 7 laterally envelop the bracket slot so that a relative movement between the arc element 2 and the transmission element 3 in a direction of the arc element 2 that is parallel to its longitudinal axis is blocked.

It is appreciated that an anchoring of the arc element 2 can be provided at various teeth 11. It is not mandatory that molars 16 are used for this purpose. The device 1 according to the invention is used according to generally accepted orthodontic rules and procedures. This relates in particular to type and manner of movement of the individual teeth 11 as well as to configuration of the transmission elements 3 as well as sizing of the cross section of the arc element 2. The latter also relates to the interaction of the activation sections 6 with the transmission elements 3 with respect to the desired movements of the respective teeth to be treated.

Figure 4:
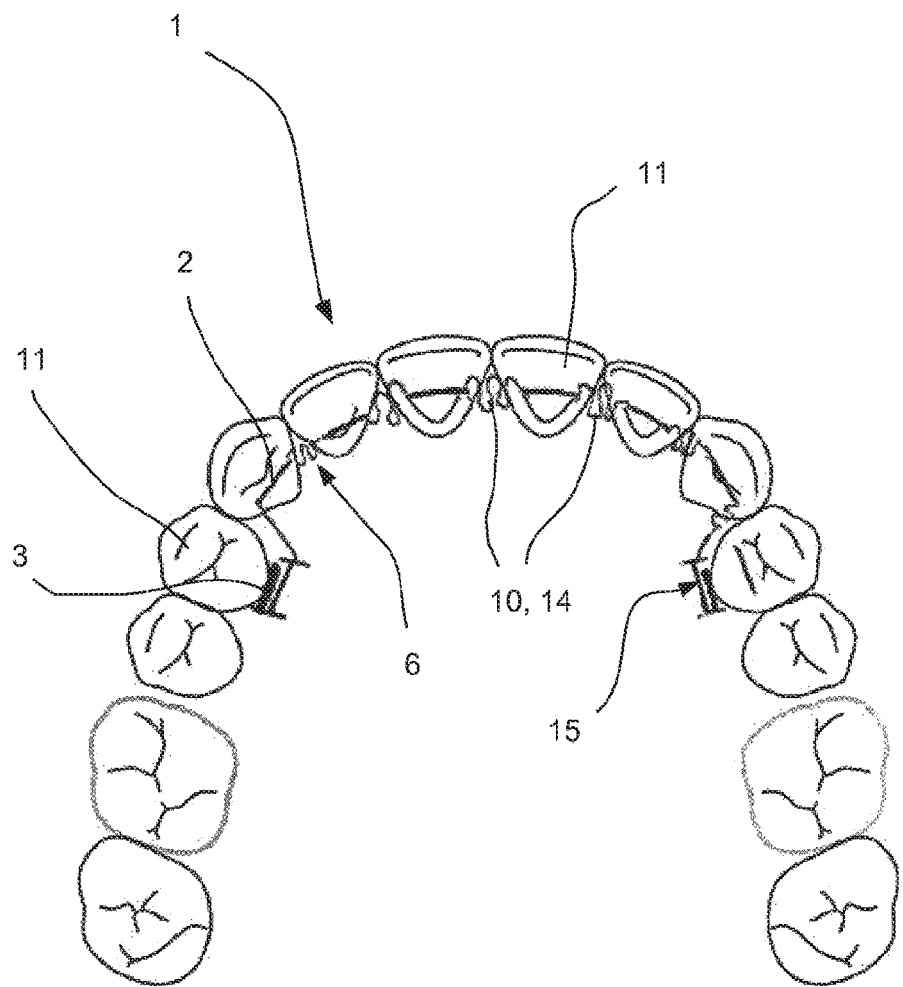
FIG. 4 illustrates an upper jaw according to FIG. 1, wherein the employed device according to the invention is provided with a plurality of activation sections.

It is evident from the embodiment according to FIG. 4 that the activation sections 6 are configured meander shaped. This meander shape of a respective activation section 6 is provided in a form of several adjacent loops, wherein the loops are respectively provided with high points in an alternating manner at their tops and bottoms. The configuration of the activation sections 6 has to be selected independently from their actual so that they can act as a spring element so that the arc element 2 can be loaded with a reset force (tension force, compression force, torsion moment, and bending moment). FIG. 8 illustrates various geometries of activation sections 6. An activation section can be configured e.g. as a U-shaped loop 14 (FIG. 8A). By the same token the omega shape provided in FIG. 8B is also conceivable. A pointed pyramid shape 8C is also conceivable. With reference to a meander shaped configuration of the activation sections reference is made to FIGS. 8D-8F.

Figure 5:
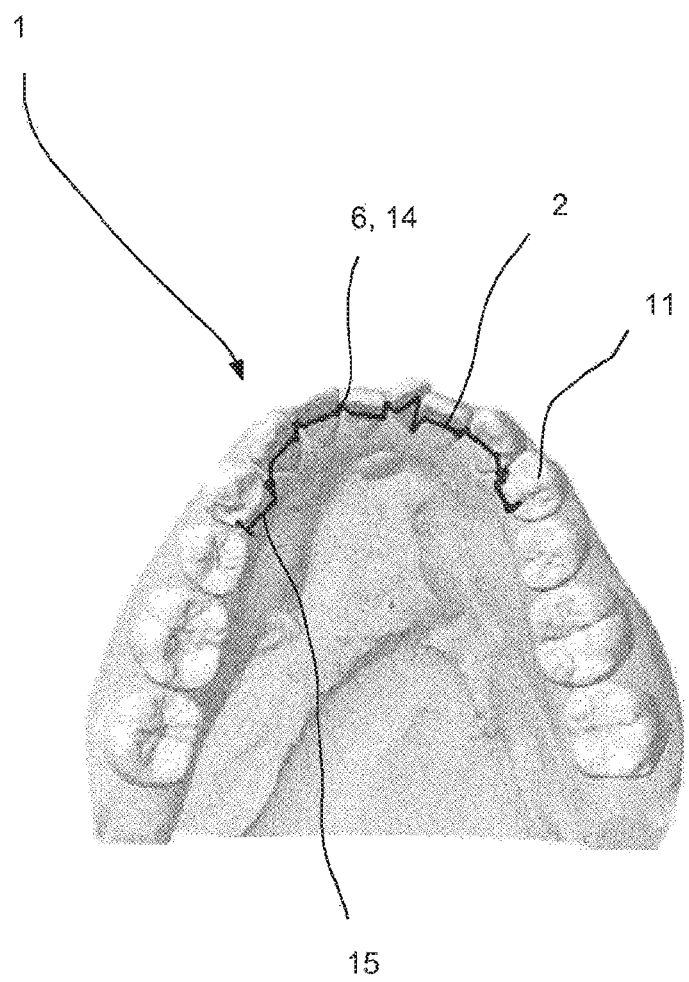
FIG. 5 illustrates a lower jaw with a plurality of teeth that cooperate with a device according to the invention.
Figure 6:
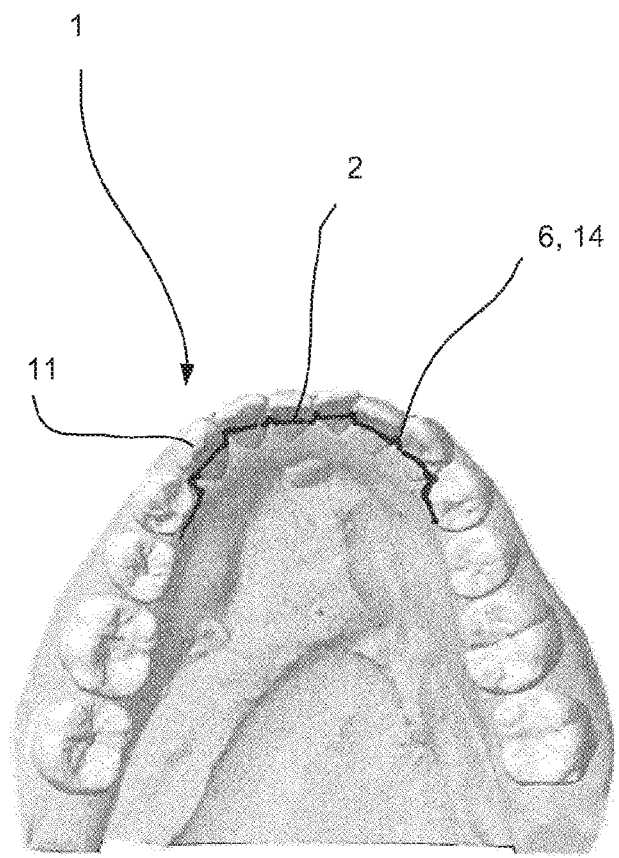
FIG. 6 illustrates the lower jaw according to FIG. 5, however in an advanced state of a treatment method for correcting tooth misalignments.
Figure 7:
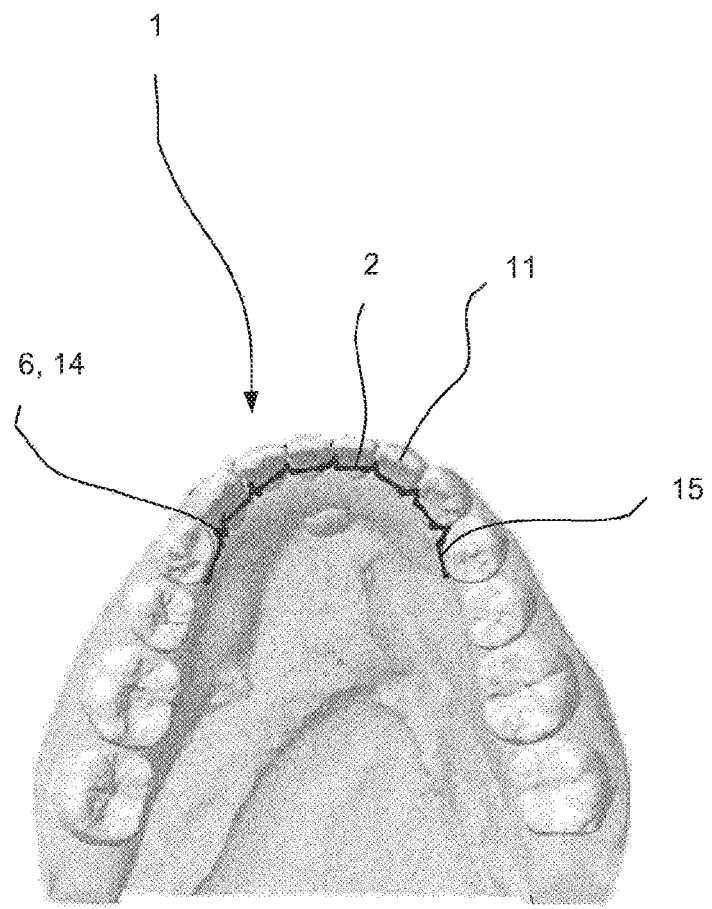
FIG. 7 illustrates the lower jaw according to FIG. 6 immediately before completion of the treatment method.

An orthodontic treatment using a device 1 according to the invention is particularly advantageous. A typical treatment is evident from FIGS. 5-7. Thus an orthodontic device 1 is used which is intended to remedy misalignment of the front incisors of a lower jaw. The device 1 is anchored on a left side and also on a right side at fourth teeth of the lower jaw counting from the center. The solid black lines in FIGS. 5-7 represent various arc elements 2 that are connected by non-illustrated transmission elements 3 with the teeth 11. Individual activation sections 6 are respectively indicated in inter dental spaces between the teeth 11 as thickness increases. It is appreciated regarding the treatment method that a respective arc element 2 has to be replaced after each completed movement increment of the teeth 11 as a function of progress of the treatment method. Thus, typically the transmission elements 3 which are arranged at the teeth 11 are maintained over the entire treatment.

This indicates in particular that the status quo before beginning of the treatment has to be detected with respect to an initial condition of the teeth to be treated in order to plan the orthodontic treatment. A desired end position of the teeth is generated as a function of this initial condition based on the virtual model. This occurs based on a virtual movement of the teeth starting from a virtual model that is derived from a detected initial condition of the teeth to be treated. The difference between the end position and the starting position of the teeth to be treated corresponds to an overall movement.

Typically, this overall movement cannot be achieved using a single orthodontic device with all identical components. Therefore, the method according to the invention breaks the overall movement down into a plurality of individual movement increments which can be facilitated by a respective orthodontic device that is identical in all its components. Each of these predetermined movement increments is associated according to the treatment method with an associated arc element 2. This has the effect that a respective arc element 2 is responsible for moving the teeth to be treated in combination with the respective transmission elements 3 far enough and into a position so that the respectively associated movement increment is completed.

As soon as the movement increment is completed the current arc element 2 is removed and the respective next arc element 2 is inserted so that the next movement element can be performed. Thus, the treatment method is a sequential method wherein the individual movement increments are performed one after the other between a starting position and an end position of the respective teeth to be treated by single individual arc elements 2.

The different shapes of the illustrated arc elements 2 are evident from FIGS. 5-7. The illustration according to FIG. 7 shows the teeth to be treated during their last movement increment wherein the teeth are in their originally planned and desired end position after completing the last movement increment.

Figure 9:
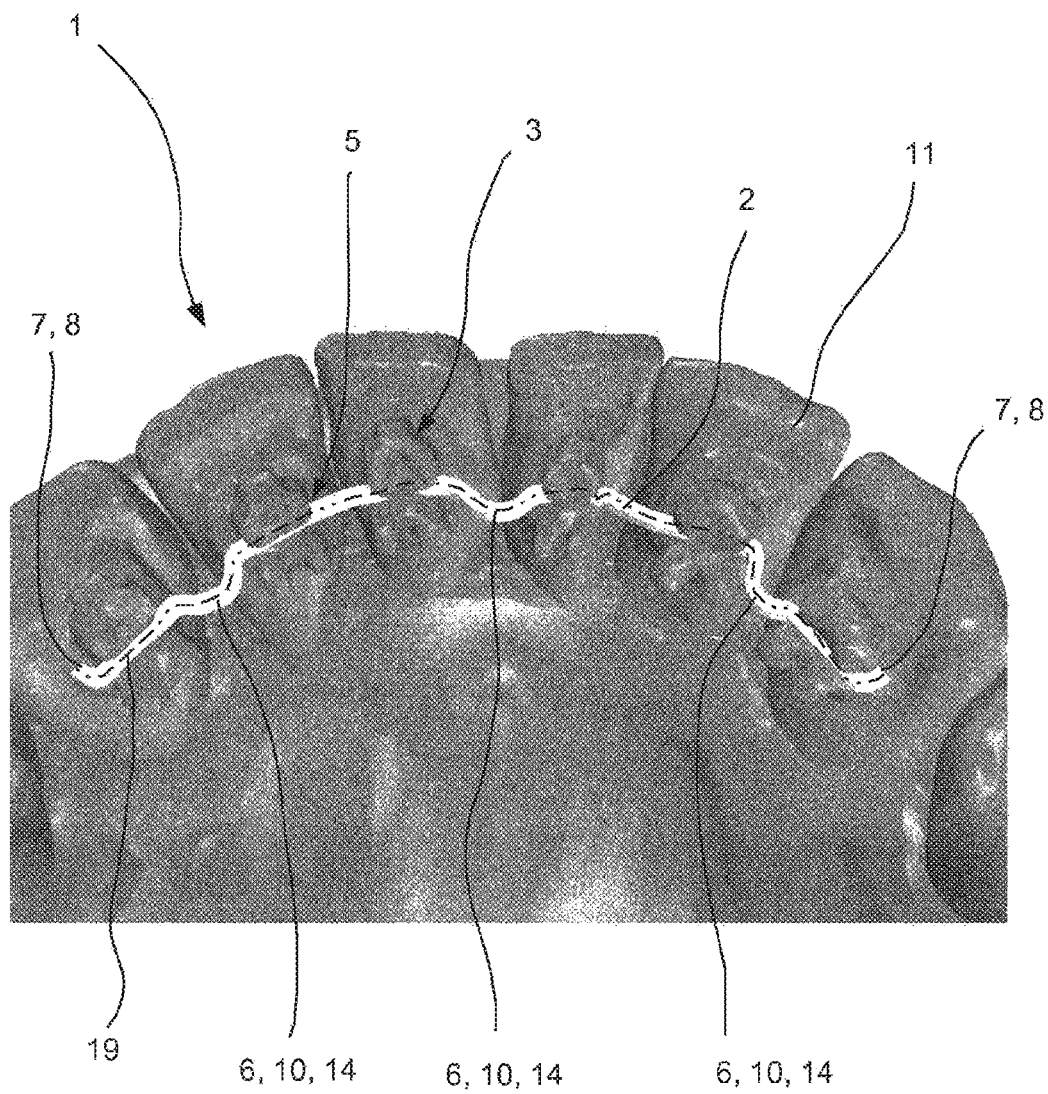
FIG. 9 illustrates a virtual representation of a lower jaw that includes a plurality of teeth that cooperate with a device according to the invention.

The illustration according to FIG. 9 illustrates another lower jaw in a portion from the third tooth on a left side to the third tooth on a right side. This illustration represents a virtual depiction of a lower jaw to be treated. A respective transmission element 3 is arranged at each of the teeth 11 to be treated. An arc element 2 is coupled with the transmission element 3 so that forces between the arc element 2 and the transmission elements 3 are transferrable. The arc element 2 has a total of three activation sections 6 in the illustrated embodiment wherein the activation sections 6 are respectively formed as loops 14 that are formed by a loop 10. The shape of these loops 14 corresponds approximately to the shape of the loops according to FIG. 8A. The arc element 2 has a longitudinal axis 19 which extends along the arc element 2. The arc element 2 is configured overall flat. This means that the longitudinal axis 19 is arranged within a non-illustrated plane which is oriented approximately perpendicular to a vertical axis of the teeth 11.

It is evident from the illustration that the teeth 11 that are to be treated and that are illustrated in the virtual model are too far remote from each other. The treatment goal for teeth 11 to be treated that have the initial position recited supra is to move the teeth 11 closer to each other. For this purpose, it is required that the intended arc element 2 after being inserted into the transmission elements 3 is provided with an inner tension so that the arc element 2 due to the reset force that acts within the arc element 2 tends to contract into its original shape. During this movement the arc element 2 shall pull the teeth 11 along that are to be treated. It is appreciated that a force transmitting coupling of the arc element 2 to the transmission elements 3 is required for this purpose. This coupling is achieved according to the invention by form locking elements 7 wherein only the respective outer form locking elements are visible in FIG. 9.

The form locking element 7 are formed by radially protruding lugs 8 which extend approximately perpendicular to the longitudinal axis of the arc element 2. The lugs 8 are configured to engage in a form locking manner with the respective adjacent transmission elements 3. In the illustrated case the lugs 8 press laterally against corresponding stop surfaces of the coupling portions 5 of the respective transmission elements 3. This way a non-slip force transmission is assured between the arc element 2 and the respective transmission elements 3.

The arc element according to FIG. 9 includes additional form locking elements 7 besides the visible form locking elements 7 which are configured as radially extending lugs 8. The lugs 8, however, are not visible in FIG. 9 since they engage corresponding recesses of the respective contacting transmission elements 3. Thus, the lugs 8 extend relative to the teeth 11 viewed in the vestibular direction into a corresponding recess of the respective transmission element 3.

It is appreciated that the teeth can be rotated by the device 1 according to the invention about their vertical axis as well as about their transversal axis in addition to a mere movement of the teeth along the jaw bone, this means bending torques are transferrable to the transmission elements 3 by the arc element 2. In order to accomplish this the respective arc element 2 is not only deflected along its length but additionally twisted or bent about its longitudinal axis 19. In any case the deformation of the arc element 2 before coupling it with the transmission elements 3 activates a reset force in the arc element 2 or a reset torque which then causes a movement of the teeth 11 to be treated due to the form locking coupling with the transmission elements 3.

It is appreciated that the individual features of the individual embodiments according to the preceding description do not depend from each other so that a person skilled in the art can combine the features with one another in other ways that are within the skill in the art.

REFERENCE NUMERALS AND DESIGNATIONS 1 device
2 arc element
3 transmission element
4 tooth surface
5 coupling portion
6 activation section
7 form locking element
8 lug
9 recess
10 loop
11 tooth
12 bracket base
13 slot
14 loop
15 anchor
16 molar
17 envelopment portion
18 hook
19 longitudinal axis

What is claimed is:
1. A device for correcting misaligned teeth, the device comprising:
an arc element; and
at least two transmission elements,
wherein each of the at least two transmission elements is configured to cooperate with a respective tooth surface and includes a respective coupling portion wherein each of the at least two transmission elements is connected or connectable in the respective coupling portion with the arc element in a force transmitting manner,
wherein the arc element has an overall parabolic cambered shape that is adapted to a lower jaw or an upper jaw of a patient,
wherein the arc element includes at least one activation section which is arranged between two adjacent transmission elements of the at least two transmission elements and configured so that the arc element is at least locally elastically deformed in an installed condition of the device,
wherein the arc element is connected with the two adjacent transmission elements in the installed condition of the device so that a reset force is provided in the arc element wherein the reset force is transferrable to the two adjacent transmission elements,
wherein the arc element includes at least one form locking element integrally provided in one piece with the arc element,
wherein the at least one form locking element cooperates with one of the two adjacent transmission elements by form locking so that a movement of the arc element relative to the one of the two adjacent transmission elements in a longitudinally parallel direction of the arc element is blocked by the form locking in the respective coupling portion of the transmission element, wherein a longitudinal axis of the arc element with the overall parabolic cambered shape extends in a plane at least in a force free condition of the arc element where the arc element is flat and free from imparted forces, and wherein at least a portion of the at least one form locking element that is provided integrally in one piece with the arc element and that provides the form locking with the one of the two adjacent transmission elements protrudes from the arc element perpendicular towards the respective tooth surface.

2. The device according to claim 1, wherein the arc element has a rectangular or square cross section, and wherein an edge length of the arc element is 0.6 mm at the most.

3. The device according to claim 1, wherein the arc element is formed from a shape memory material, a nickel titanium alloy, or Nitinol.

4. The device according to claim 1, wherein the arc element is configured as a loop or meander shaped in the at least one activation section so that the arc element is configured to act as a spring in the at least one activation section.

5. The device according to claim 1, wherein the arc element includes at least two form locking elements that are offset from each other, and wherein at least two of the form locking elements correspond with each other so that they cooperate with an identical transmission element of the at least two transmission elements in an installed condition of the device.

6. The device according to claim 1, wherein the at least one form locking element is formed by a lug that extends radially relative to the longitudinal axis of the arc element, and wherein one of the at least two transmission elements includes a recess which is engaged by the lug in a form locking manner.

7. The device according to claim 1, wherein the arc element includes at least one local curvature that has a curvature radius of 1.0 mm at the most.

8. The device according to claim 1, wherein the arc element is integrally configured in one piece.

\* \* \* \* \*